US012596344B2

(12) United States Patent
Ichikawa et al.

(10) Patent No.: US 12,596,344 B2
(45) Date of Patent: Apr. 7, 2026

(54) CONTROL SYSTEM, CONTROL PROGRAM TRANSMISSION METHOD, AND RECORDING MEDIUM

(71) Applicant: Mitsubishi Electric Corporation, Tokyo (JP)

(72) Inventors: Eiji Ichikawa, Nagoya (JP); Ryoichi Sasaki, Tokyo (JP); Hajime Tanide, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 414 days.

(21) Appl. No.: 18/033,578

(22) PCT Filed: Jun. 8, 2021

(86) PCT No.: PCT/JP2021/021794
§ 371 (c)(1),
(2) Date: Apr. 25, 2023

(87) PCT Pub. No.: WO2022/259384
PCT Pub. Date: Dec. 15, 2022

(65) Prior Publication Data
US 2023/0393549 A1      Dec. 7, 2023

(51) Int. Cl.
*G05B 19/05* (2006.01)

(52) U.S. Cl.
CPC ......... *G05B 19/056* (2013.01); *G05B 19/058* (2013.01)

(58) Field of Classification Search
CPC ........ G05B 19/056; G05B 19/058; G06F 8/65
See application file for complete search history.

(56) References Cited

U.S. PATENT DOCUMENTS

| | | | | |
|---|---|---|---|---|
| 2013/0091346 A1* | 4/2013 | Condorelli | .............. | G06F 8/654 |
| | | | | 713/2 |
| 2015/0271161 A1* | 9/2015 | Katsuta | ................... | H04L 63/08 |
| | | | | 713/171 |
| 2020/0193000 A1* | 6/2020 | Simonsen | ............. | H04L 9/3242 |

FOREIGN PATENT DOCUMENTS

| | | | | | |
|---|---|---|---|---|---|
| CN | 112305986 A | * | 2/2021 | .......... | G05B 19/058 |
| JP | 2007-179115 A | | 7/2007 | | |

(Continued)

OTHER PUBLICATIONS

PLC Protection System Based On Verification Separation, Method And Medium (CN 112305986 A) (Year: 2021).*

(Continued)

*Primary Examiner* — Ziaul A Chowdhury
(74) *Attorney, Agent, or Firm* — XSENSUS LLP

(57) ABSTRACT

The control system (1000) includes a programmable logic controller (PLC) (40) to control a device, and a program transmission apparatus (10) to transmit a control program (70) for causing the PLC (40) to control the device. The program transmission apparatus (10) includes a first code generator (113) to generate a first code (71) for verification of presence or absence of a change from the control program (70) by using the control program (70) and confidential data (80). The PLC (40) includes a second code generator (433) to generate a second code by using a receiving program as the control program (70) and the confidential data (80) that is shared with the program transmission apparatus (10), and an executor (435) to execute the receiving program when the first code (71) is identical to the second code.

13 Claims, 12 Drawing Sheets

(56)        References Cited

FOREIGN PATENT DOCUMENTS

JP          2018-128722  A      8/2018
WO          2014/097444  A1     6/2014

OTHER PUBLICATIONS

International Search Report and Written Opinion mailed on Aug. 10, 2021, received for PCT Application PCT/JP2021/021794, filed on Jun. 8, 2021, 9 pages including English Translation.

* cited by examiner

FIG.5

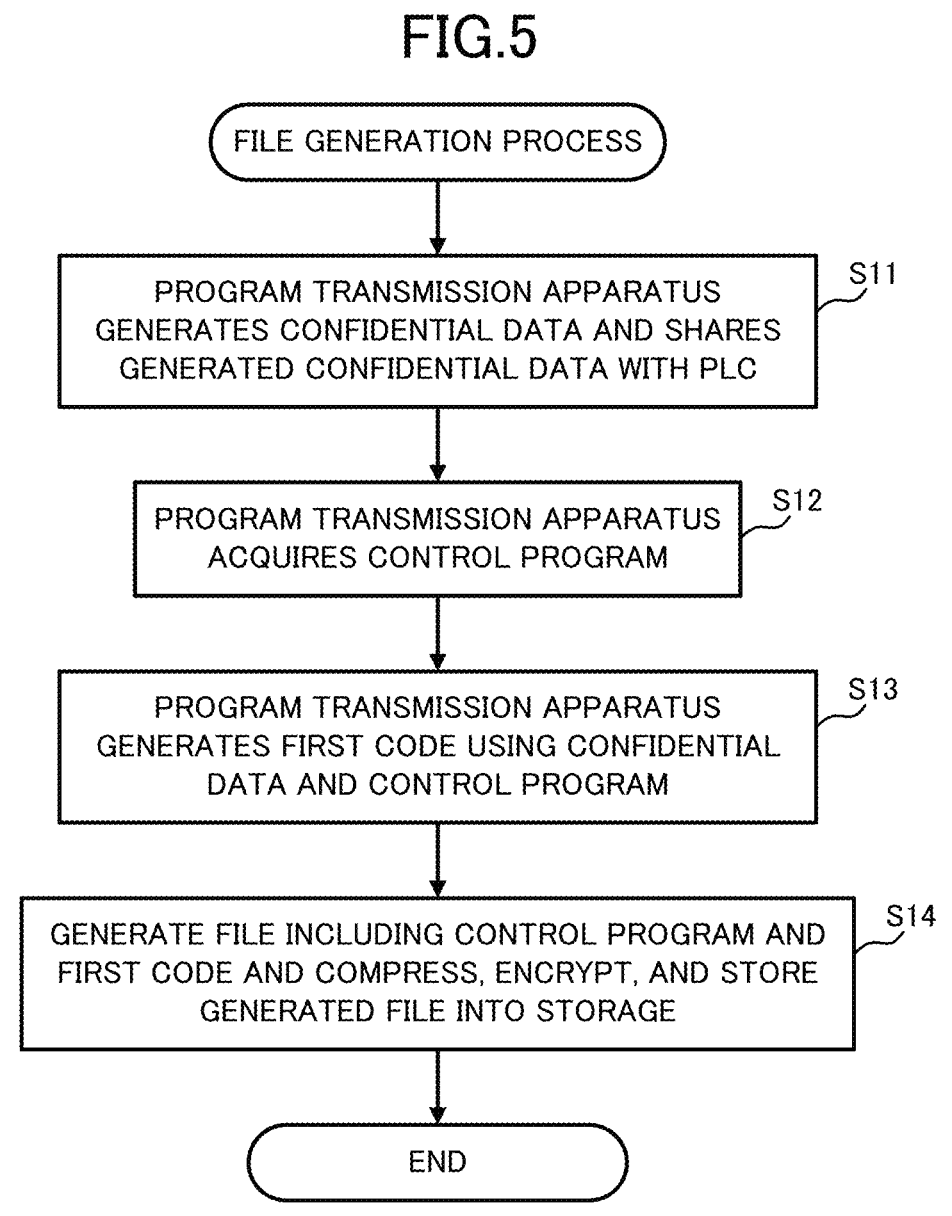

FILE GENERATION PROCESS

PROGRAM TRANSMISSION APPARATUS GENERATES CONFIDENTIAL DATA AND SHARES GENERATED CONFIDENTIAL DATA WITH PLC — S11

PROGRAM TRANSMISSION APPARATUS ACQUIRES CONTROL PROGRAM — S12

PROGRAM TRANSMISSION APPARATUS GENERATES FIRST CODE USING CONFIDENTIAL DATA AND CONTROL PROGRAM — S13

GENERATE FILE INCLUDING CONTROL PROGRAM AND FIRST CODE AND COMPRESS, ENCRYPT, AND STORE GENERATED FILE INTO STORAGE — S14

END

FIG.7

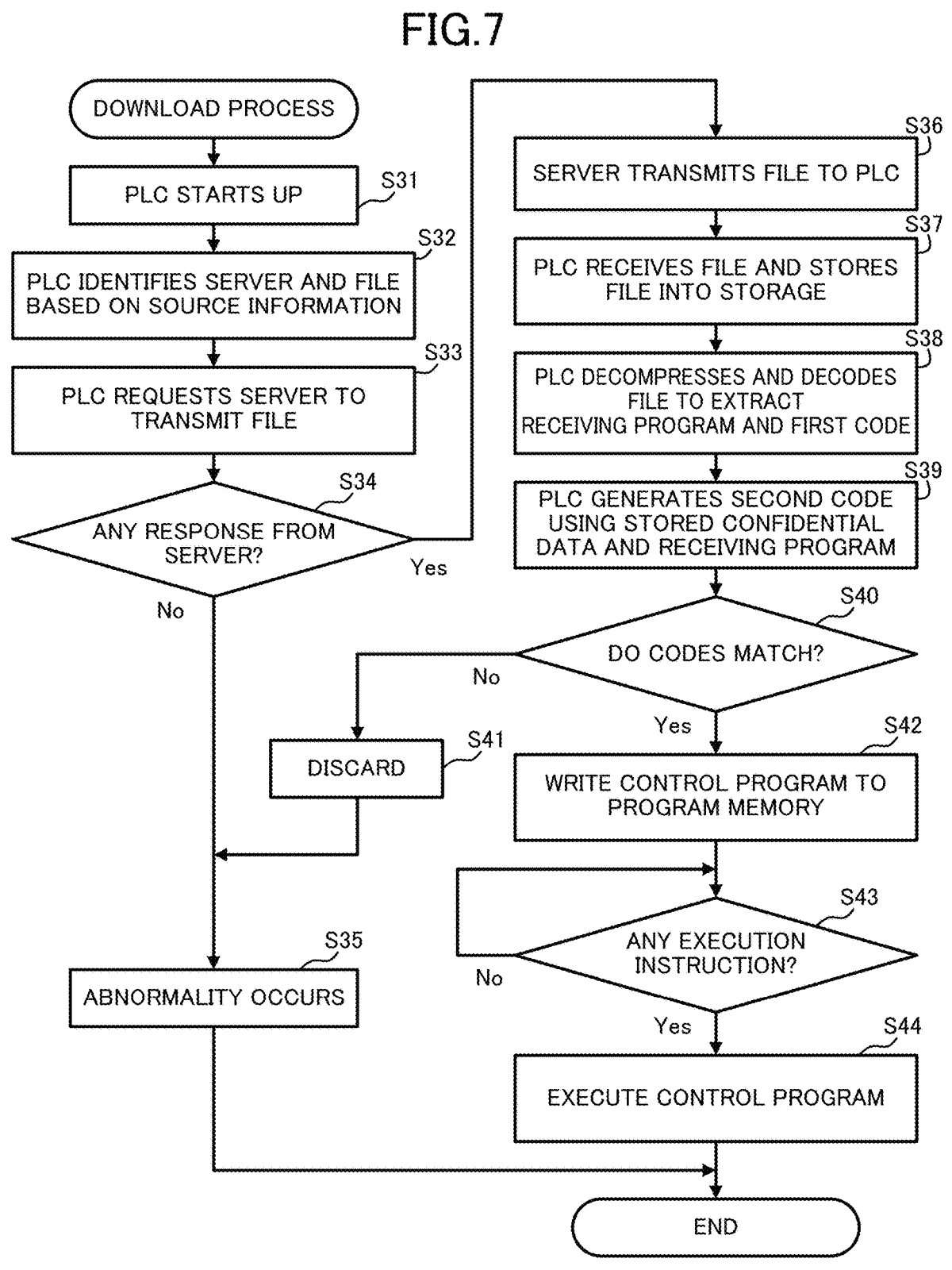

DOWNLOAD PROCESS

PLC STARTS UP — S31

PLC IDENTIFIES SERVER AND FILE BASED ON SOURCE INFORMATION — S32

PLC REQUESTS SERVER TO TRANSMIT FILE — S33

ANY RESPONSE FROM SERVER? — S34

No

ABNORMALITY OCCURS — S35

Yes

SERVER TRANSMITS FILE TO PLC — S36

PLC RECEIVES FILE AND STORES FILE INTO STORAGE — S37

PLC DECOMPRESSES AND DECODES FILE TO EXTRACT RECEIVING PROGRAM AND FIRST CODE — S38

PLC GENERATES SECOND CODE USING STORED CONFIDENTIAL DATA AND RECEIVING PROGRAM — S39

DO CODES MATCH? — S40

No

DISCARD — S41

Yes

WRITE CONTROL PROGRAM TO PROGRAM MEMORY — S42

ANY EXECUTION INSTRUCTION? — S43

No

Yes

EXECUTE CONTROL PROGRAM — S44

END

CONTROL SYSTEM, CONTROL PROGRAM TRANSMISSION METHOD, AND RECORDING MEDIUM

CROSS-REFERENCE TO RELATED APPLICATION

The present application is based on PCT filing PCT/JP2021/021794, filed Jun. 8, 2021, the entire contents of which are incorporated herein by reference.

TECHNICAL FIELD

The present disclosure relates to a control system, a programmable controller, a control program transmission method, and a controller program.

BACKGROUND ART

At the sites with factory automation (FA), programmable logic controllers (PLCs) often control other devices to perform various processes such as processes in manufacturing lines. To write a program for controlling devices to an internal memory of a PLC, a dedicated engineering tool is typically operated in a personal computer (PC) preconnected to the PLC.

The engineering tool is thus to be installed in the PC. Any incorrect operation performed by a user inexperienced with the engineering tool may cause an inappropriate program to be written to the PLC. The PLC may use a technique for the device to independently acquire, from an external source, a program to be executed (see, for example, Patent Literature 1).

Patent Literature 1 describes a programmable display connected to a PLC to function as an operation terminal in a control system. At the startup, the programmable display acquires a program for controlling the operation of the programmable display from a server and writes the program to a built-in data memory in the programmable display.

CITATION LIST

Patent Literature

Patent Literature 1: Unexamined Japanese Patent Application Publication No. 2007-179115

SUMMARY OF INVENTION

Technical Problem

However, the technique described in Patent Literature 1 may not respond to any corruption or tampering of the program transmitted from the server. The technique described in Patent Literature 1 used with a PLC may cause a program unintended by the user to be installed in the PLC and may cause an inappropriate process. The security of a program acquired from an external source by a PLC is to be improved.

The present disclosure is made in view of the above circumstances, and an objective of the present disclosure is to improve the security relating to a program acquired by a PLC from an external source.

Solution to Problem

To achieve the above objective, a control system according to the present disclosure includes a programmable controller to control a device and a program transmission apparatus to transmit a control program for causing the programmable controller to control the device. The program transmission apparatus includes program acquisition means for acquiring the control program, first code generation means for generating, from the control program and predetermined data by a predetermined procedure, a first code for verification of presence or absence of a change from the control program, and transmission means for transmitting the control program and the first code. The programmable controller includes receiving means for receiving the first code and a receiving program as the control program transmitted by the transmission means, second code generation means for generating, by the above procedure, a second code from the receiving program and the data that is shared in advance with the program transmission apparatus, and execution means for executing the receiving program when the first code is identical to the second code.

Advantageous Effects of Invention

According to the present disclosure, improvement can be achieved in security relating to a program acquired from an external source by the PLC as the programmable controller.

BRIEF DESCRIPTION OF DRAWINGS

FIG. 5 is a flowchart illustrating a file generation process according to Embodiment 1;

FIG. 7 is a flowchart illustrating a download process according to Embodiment 1;

DESCRIPTION OF EMBODIMENTS

A control system 1000 according to embodiments of the present disclosure is described in detail below with reference to the drawings. In the control system 1000, a code unique to a program to be executed by a programmable logic controller (PLC) is created before the program is stored in a server, and verification of whether the created code matches a code created based on the program provided to the PLC is performed.

Embodiment 1

Figure 1:
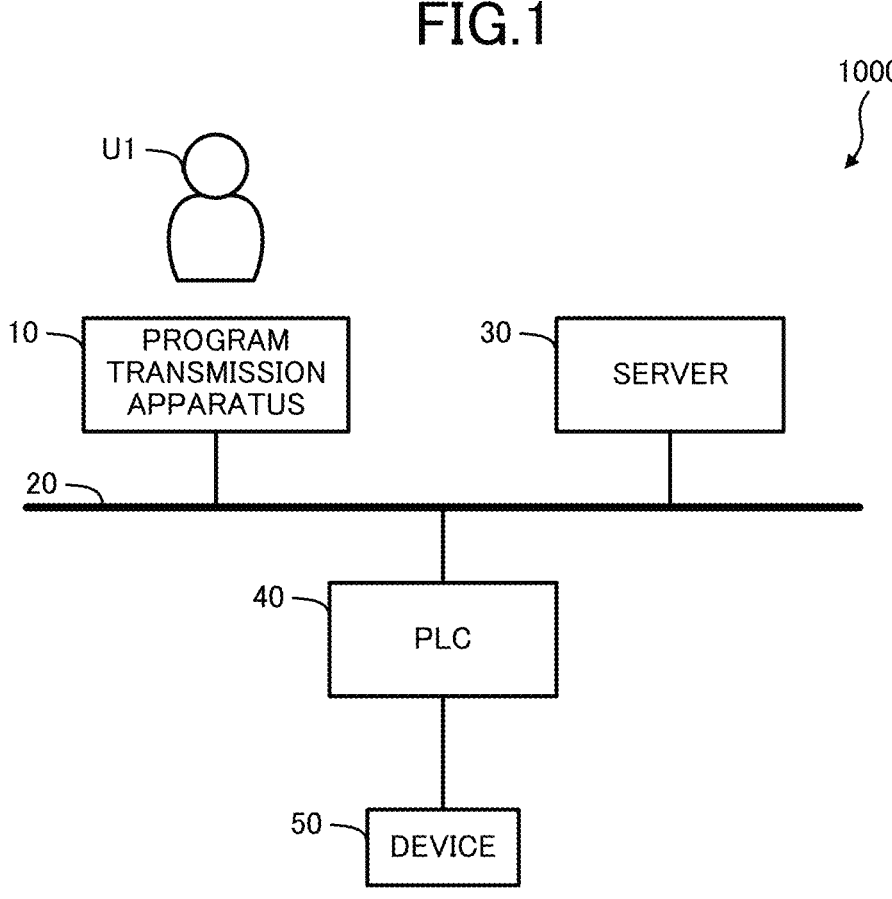
FIG. 1 illustrates configuration of a control system according to Embodiment 1.

FIG. 1 is a diagram of the control system 1000 according to the present embodiment illustrating an example structure. The control system 1000 is installed at a facility, such as a factory. The control system 1000 performs various processes in, for example, a product manufacturing line or a workpiece machining line by controlling a device 50. As illustrated in FIG. 1, the control system 1000 includes a program transmission apparatus 10 operable by a user U1, a server 30 connected to the program transmission apparatus 10 with a network 20, a PLC 40 connected to the server 30 with the network 20, and the device 50 to be a control target by the PLC.

The network 20 may be an industrial field network installed at a facility or an information network such as a local area network (LAN). The program transmission apparatus 10, the server 30, and the PLC 40 communicate with other devices by transmitting and receiving data through the network 20.

The program transmission apparatus 10 is, for example, a PC, such as an industrial personal computer (IPC), a smartphone, a tablet terminal, or another terminal. The user U1 operates the program transmission apparatus 10 to create a control program that causes the PLC 40 to control the device 50 and upload the control program to the server 30 for storage. The control program is, for example, a ladder program executable in the PLC 40.

The program transmission apparatus 10 may receive a completed control program from another device and upload the control program to the server 30 in accordance with an operation performed by the user U1 or may upload a control program created in the program transmission apparatus 10 to the server 30 through another device. The program transmission apparatus 10 may be constantly connected to the network 20 or may be temporarily connected to the network 20.

The server 30 is a computer that functions as a storage in the network 20. The server 30 stores the control program uploaded from the program transmission apparatus 10 and provides the control program to the PLC 40. Typically, the server 30 has constant access to the network 20. The control program stored in the server 30 may be inappropriately altered by a factor such as user mishandling, inconsistency of intent among multiple users, and tampering by third parties.

The PLC 40 is a programmable controller that controls the device 50. The PLC 40 executes a control program to control the device 50. The PLC 40 may execute a control program to control the device 50 through cooperation with another PLC 40 (not illustrated). The PLC 40 may be constantly connected to the network 20 or may be temporarily connected to the network 20 when acquiring a control program.

The device 50 is a piece of FA equipment, such as a sensor, an actuator, a motor, a valve, or a robot. The device 50 is connected to the PLC 40 with signal lines to transmit and receive voltage or current signals to and from the PLC 40. For the device 50 being a robot, for example, the device 50 notifies the PLC 40 of a sensing result from a built-in sensor in the device 50 and moves a robot arm in accordance with a control command output from the PLC 40 based on the sensing result. Although the single device 50 is illustrated in FIG. 1 as a typical example, two or more devices 50 may be connected to the PLC 40.

Figure 2:
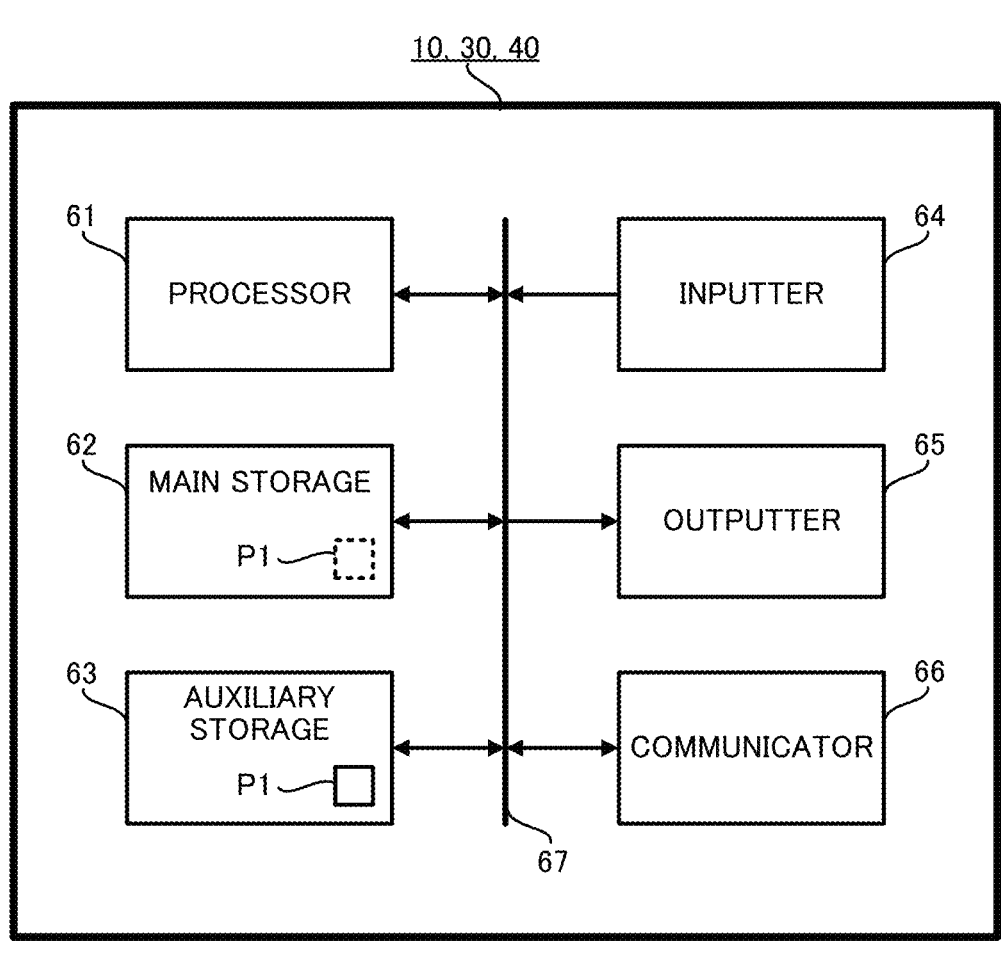
FIG. 2 illustrates hardware configuration of a program transmission apparatus, a server, or a PLC according to Embodiment 1.

FIG. 2 is a diagram of the program transmission apparatus 10, illustrating the hardware structure. The structure of the server 30 and the PLC 40 is also similar to the structure illustrated in FIG. 2. Thus, the reference signs for the program transmission apparatus 10, the server 30, and the PLC 40 are also illustrated in the figure and are referred to. As illustrated in FIG. 2, the program transmission apparatus 10, the server 30, and the PLC 40 each include a processor 61, a main storage 62, an auxiliary storage 63, an inputter 64, an outputter 65, and a communicator 66. The main storage 62, the auxiliary storage 63, the inputter 64, the outputter 65, and the communicator 66 are all connected to the processor 61 with an internal bus 67.

The processor 61 includes a micro processing unit (MPU) or a central processing unit (CPU) that is an integrated circuit. The processor 61 executes a program P1 stored in the auxiliary storage 63 to implement various functions to perform the processes described below. The program P1 for the PLC 40 corresponds to an example of a controller program for causing the PLC 40 to function as means described later.

The main storage 62 includes a random-access memory (RAM). The main storage 62 stores the program P1 loaded from the auxiliary storage 63. The main storage 62 is used as a work area for the processor 61.

The auxiliary storage 63 includes a nonvolatile memory, such as an electrically erasable programmable read-only memory (EEPROM), a hard disk drive (HDD), and a detachable memory card. The auxiliary storage 63 stores various types of data used for processing in the processor 61 in addition to the program P1. The auxiliary storage 63 provides data to be used by the processor 61 to the processor 61 as instructed by the processor 61 and stores data provided by the processor 61. Although FIG. 2 illustrates the single program P1 as a typical example, multiple programs may be stored in the auxiliary storage 63 or loaded into the main storage 62.

The inputter 64 includes, for example, an input key, a keyboard, a pointing device, a switch, or a button. The inputter 64 acquires information input by the user and provides the acquired information to the processor 61.

The outputter 65 includes, for example a light-emitting diode (LED), a liquid crystal display (LCD), or a speaker. The outputter 65 presents various items of information to the user as instructed by the processor 61.

The communicator 66 includes a network interface circuit for communicating with an external device. The communicator 66 receives a signal from the external device and outputs data represented by the signal to the processor 61. The communicator 66 also transmits a signal representing data output from the processor 61 to the external device.

The transmission of the control program in the present embodiment is briefly described with reference to FIG. 3.

Figure 3:
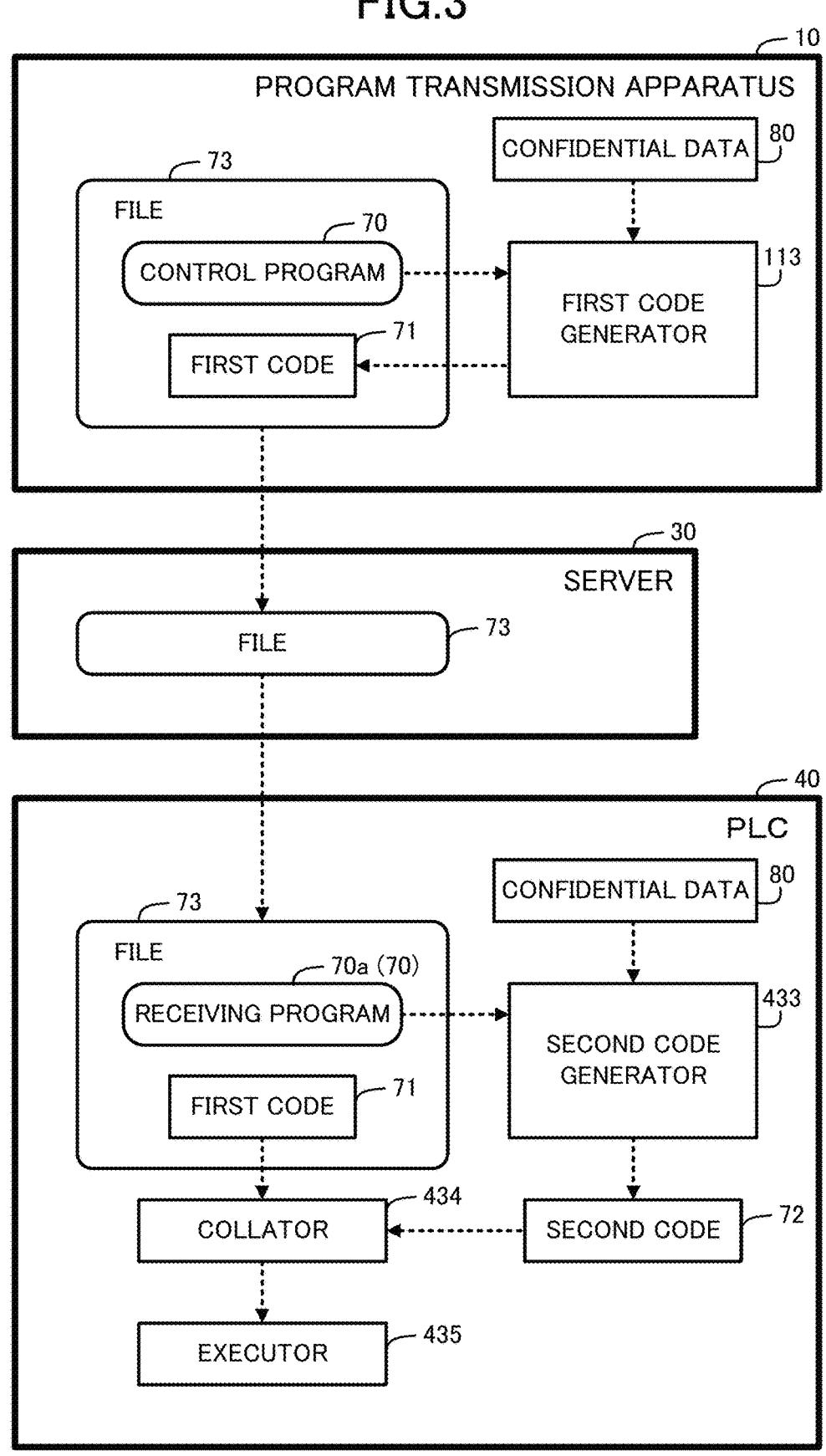
FIG. 3 is a diagram for explanation of transmission of a control program according to Embodiment 1.

As illustrated in FIG. 3, the program transmission apparatus 10 includes a first code generator 113 that generates a first code 71 unique to a combination of a control program 70 and confidential data 80. The confidential data 80 is predetermined data, or for example, a random bit sequence of 256 or 1024 bits. The first code 71 may be, for example, a hash value acquired as an output value when a data piece including the control program 70 and the confidential data 80 concatenated in this order is input into a hash function such as Secure Hash Algorithm 2 (SHA-2) and SHA-3 or may be a value acquired with another method.

The program transmission apparatus 10 transmits a file 73 including the control program 70 and the first code 71 to the server 30. The server 30 stores the file 73 and provides the file 73 to the PLC 40 in accordance with a request from the PLC 40.

The PLC 40 includes a second code generator 433 that generates, from a receiving program 70*a* as the control program 70 in the acquired file 73 and the confidential data 80 that is shared in advance with the program transmission apparatus a second code 72 unique to a combination of the receiving program 70a and the confidential data 80. When the file 73 is provided to the PLC 40 as intended by the user, the receiving program 70a included in the file 73 is the same program as the control program 70. In this case, the first code 71 is identical to the second code 72. When the file 73 stored in the server 30 is altered due to any factor, the receiving program 70a in the file 73 provided to the PLC 40 deviates from the intention of the user and differs from the control program 70. In this case, the first code 71 differs from the second code 72. A method for generating the second code 72 by the second code generator 433 is the same as the method for generating the first code 71 by the first code generator 113 of the program transmission apparatus 10.

A collator 434 of the PLC 40 then collates the first code 71 included in the file 73 with the second code 72. When the two codes match, the receiving program 70a is identical to the control program 70. An executor 435 of the PLC 40 executes the receiving program 70a that is the control program 70.

The functional components of the program transmission apparatus 10, the server 30, and the PLC 40 are described with reference to FIG. 4.

Figure 4:
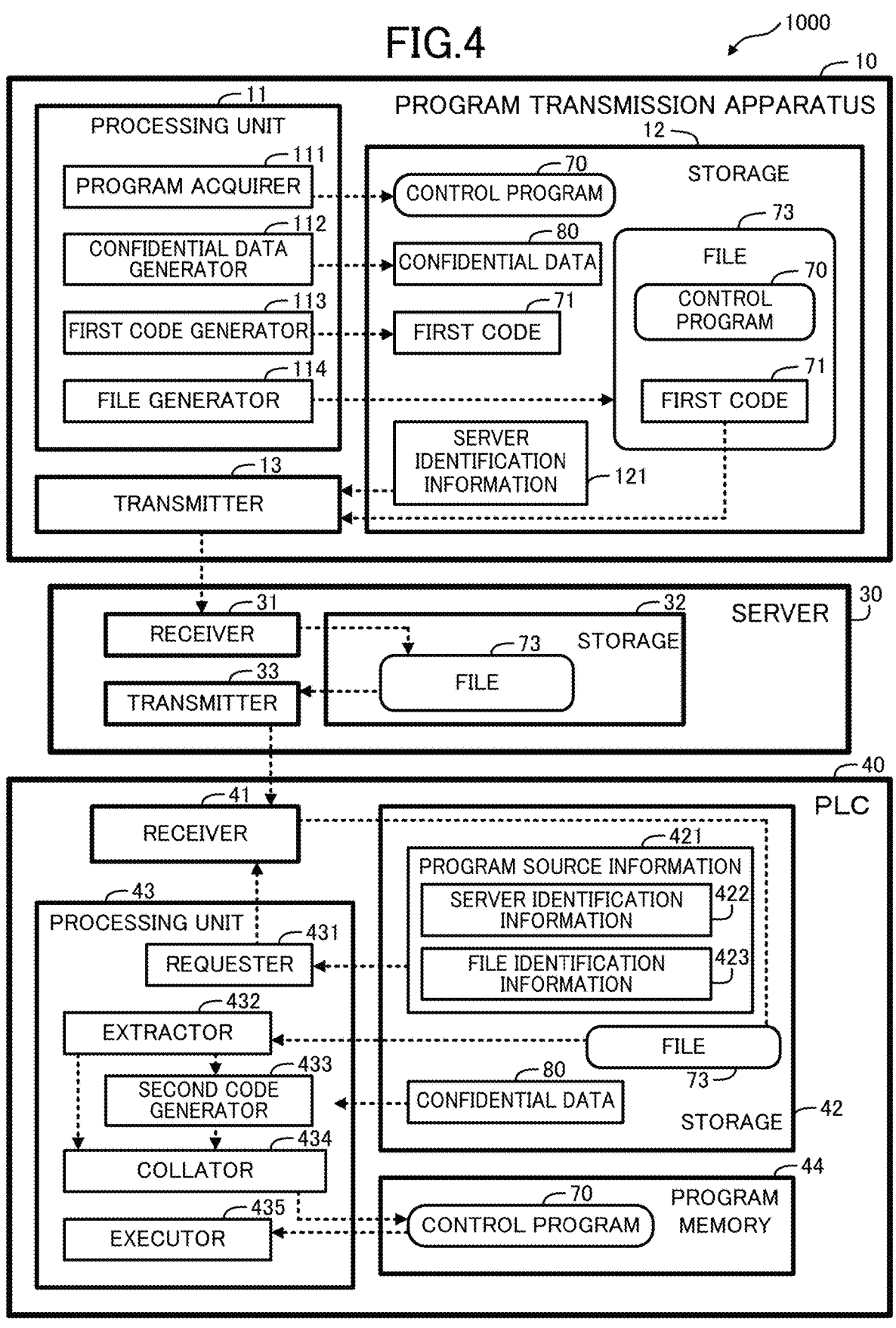
FIG. 4 illustrates functional configuration of the program transmission apparatus, the server, and the PLC according to Embodiment 1.

As illustrated in FIG. 4, the program transmission apparatus 10 includes a processing unit 11 that performs various processes, a storage 12 storing various types of data, and a transmitter 13 that transmits information to the server 30.

The processing unit 11 is implemented mainly by the processor 61 of the program transmission apparatus 10. The processing unit 11 includes a program acquirer 111 for acquiring the control program 70, a confidential data generator 112 for generating the confidential data 80, a first code generator 113 for generating the first code 71, and a file generator 114 for generating the file 73 including the control program 70 and the first code 71.

The program acquirer 111 acquires the control program 70 input by the user U1 operating the inputter 64. The program acquirer 111 may acquire the control program 70 by reading the control program 70 from an address in the auxiliary storage 63 or an external device specified by the user U1. The program acquirer 111 stores the acquired control program 70 into the storage 12. The program acquirer 111 corresponds to an example of program acquisition means, in the program transmission apparatus 10, for acquiring the control program 70.

The confidential data generator 112 generates the confidential data 80 and stores the confidential data 80 into the storage 12 using, as a seed value, for example, a time when the program acquirer 111 acquires the control program 70 or a time when generation of the confidential data 80 is instructed by the user.

The first code generator 113 reads the control program 70 and the confidential data 80 from the storage 12, generates the first code 71 based on the control program 70 and the confidential data 80, and stores the first code 71 into the storage 12. In detail, the first code generator 113 generates a hash value of the confidential data 80 and the control program 70 as the first code 71. The first code generator 113 corresponds to an example of first code generation means, in the program transmission apparatus 10, for generating, from the control program 70 and predetermined data by a predetermined procedure, the first code 71 for verification of presence or absence of a change from the control program 70.

The file generator 114 reads the control program 70 and the first code 71 from the storage 12, compresses and encrypts the control program 70 and the first code 71, and generates the file 73. Although any compression and encryption methods may be used, a method having a low computational load during decompression and decoding may allow a PLC 40 with insufficient computational resources to perform the decompression and decoding. The file generator 114 may generate the file 73 without compressing the control program 70 and the first code 71 or may generate the file 73 without encryption. The file generator 114 corresponds to an example of encryption means, in the program transmission apparatus 10, for encrypting the control program 70 and the first code 71.

The storage 12 is implemented mainly by at least one of the main storage 62 or the auxiliary storage 63 of the program transmission apparatus 10. The user U1 prestores server identification information 121 into the storage 12. The server identification information 121 is, for example, an internet protocol (IP) address or a station number indicating the location of the server 30 in the network 20.

The transmitter 13 is implemented mainly by the processor 61 and the communicator 66 of the program transmission apparatus 10 that operate in cooperation. The transmitter 13 reads the server identification information 121 and the file 73 from the storage 12 in accordance with an operation of the user U1 and transmits the file 73 to the server 30 indicated by the server identification information 121. The transmitter 13 corresponds to an example of transmission means, in the program transmission apparatus 10, for transmitting the control program 70 and the first code 71 and corresponds to an example of transmission means, in the program transmission apparatus 10, for transmitting the control program 70 and the first code 71 encrypted by the encryption means.

The server 30 includes a receiver 31 that receives the file 73 from the program transmission apparatus 10, a storage 32 storing the file 73, and a transmitter 33 that transmits the file 73 to the PLC 40. The receiver 31 and the transmitter 33 are each implemented mainly by the communicator 66 of the server 30. The storage 32 is implemented mainly by at least one of the main storage 62 or the auxiliary storage 63 of the server 30.

The receiver 31 receives the file 73 transmitted by the transmitter 13 of the program transmission apparatus 10 and stores the file 73 into the storage 32.

The transmitter 33 responds to a request from the PLC 40 by reading the control program 70 from the storage 32 and transmitting the control program 70 to the PLC 40. The server 30 corresponds to an example of a server in the control system 1000 that receives the control program 70 and the first code 71 transmitted by the transmission means of the program transmission apparatus 10 and that transmits to the programmable controller the received first code 71 and the receiving program 70a as the received control program 70.

The PLC 40 includes a receiver 41 that receives the file 73 from the server 30, a storage 42 storing various types of data, a processing unit 43 that performs various processes, and a program memory 44 storing the control program 70 to be executed.

The receiver 41 is implemented mainly by the communicator 66 of the PLC The receiver 41 requests the server 30 to transmit the file 73 in accordance with an instruction from a requester 431 of the processing unit 43, receives the file 73 transmitted from the server 30 as a response to the request, and stores the file 73 into the storage 42. The receiver 41 corresponds to an example of receiving means, in the PLC 40, for receiving the receiving program 70a as the control program transmitted by the transmission means of the program transmission apparatus 10 and the first code 71 and corresponds to an example of receiving means, in the PLC 40, for receiving the encrypted receiving program 70a and the encrypted first code 71.

The storage 42 is implemented mainly by at least one of the main storage 62 or the auxiliary storage 63 of the PLC 40. The storage 42 prestores program source information 421 indicating the source from which the control program 70 is acquired, and confidential data 80 identical to the confidential data 80 stored in the program transmission apparatus 10.

The program source information 421 includes server identification information 422 indicating the location of the server 30 in the network 20 and file identification information 423 for identifying the file 73 stored in the server 30. The server identification information 422 is, for example, the IP address or the station number of the server 30. The file identification information 423 is, for example, the file name or the address of the file 73 stored in the storage 32 of the server 30. The program source information 421 is read from the storage 42 by the requester 431 of the processing unit 43 and is used by the receiver 41 to specify, for the server 30, the file 73 to be transmitted from the server 30.

The confidential data 80 is shared between the program transmission apparatus 10 and the PLC 40 with any method and is not provided to the server 30. For example, the user U1 may operate the program transmission apparatus 10 to store the confidential data 80 in a non-transitory recording medium, such as a memory card, and insert the non-transitory recording medium into a card slot of the PLC 40 to store the confidential data 80 into the storage 42 of the PLC 40. The user U1 may connect the program transmission apparatus 10 to the PLC 40 with a communication line such as a universal serial bus (USB) without the network 20 to transfer the confidential data 80 to the PLC 40. The confidential data 80 may be transmitted from the program transmission apparatus 10 to the PLC 40 through the network 20 without or through the server 30. When the confidential data 80 is transmitted through the network 20, the confidential data 80 may be transmitted after secure communication is established. In this case, the confidential data 80 is transmitted by the transmitter 13 of the program transmission apparatus 10 and received by the receiver 41.

The processing unit 43 is implemented mainly by the processor 61 of the PLC 40. The processing unit 43 includes the requester 431 that requests the file 73 from the server 30, an extractor 432 that extracts the receiving program 70a and the first code 71 from the received file 73, the second code generator 433 that generates the second code 72 based on the receiving program 70a extracted by the extractor 432, the collator 434 that collates the first code 71 with the second code 72, and the executor 435 that executes the control program 70 when the two codes match.

The requester 431 reads the program source information 421 from the storage 42 at the startup of the PLC 40, and causes the receiver 41 to request the server 30 indicated by the server identification information 422 to provide the file 73 indicated by the file identification information 423.

The extractor 432 reads the file 73 received by the receiver 41 and stored in the storage 42 and extracts the receiving program 70a and the first code 71 from the file 73 by decompression and decoding. The extractor 432 corresponds to an example of decoding means, in the PLC 40, for decoding the encrypted receiving program 70a and the encrypted first code 71.

The second code generator 433 generates, with the same method as the first code generator 113 of the program transmission apparatus 10, the second code 72 from the receiving program 70a extracted by the extractor 432 and the confidential data 80 read from the storage 42. In detail, the second code generator 433 generates a hash value of the confidential data 80 and the receiving program 70a as the second code 72. More specifically, the second code generator 433 acquires the second code 72 as the hash value output upon input of the receiving program 70a and the confidential data 80 into a software application to undergo a hash function similar to the hash function of the first code generator 113. The second code generator 433 corresponds to an example of second code generation means, in the PLC 40, for generating by the predetermined procedure the second code 72 from the receiving program and data shared in advance with the program transmission apparatus.

The collator 434 collates the first code 71 extracted by the extractor 432 with the second code 72 generated by the second code generator 433. When the two codes match, the collator 434 stores the control program 70 that is the receiving program 70a extracted by the extractor 432 into the program memory 44.

The executor 435 reads the control program 70 from the program memory 44 and executes the control program 70 to control the device 50. The executor 435 may execute the control program 70 when the PLC 40 starts up, when an execution button on the PLC 40 is pressed, or when a switch for a run operation is turned on. The executor 435 corresponds to an example of execution means, in the PLC 40, for executing the receiving program when the first code 71 is identical to the second code 72.

The program memory 44 is implemented mainly by at least one of the main storage 62 or the auxiliary storage 63 of the PLC 40.

Figure 6:
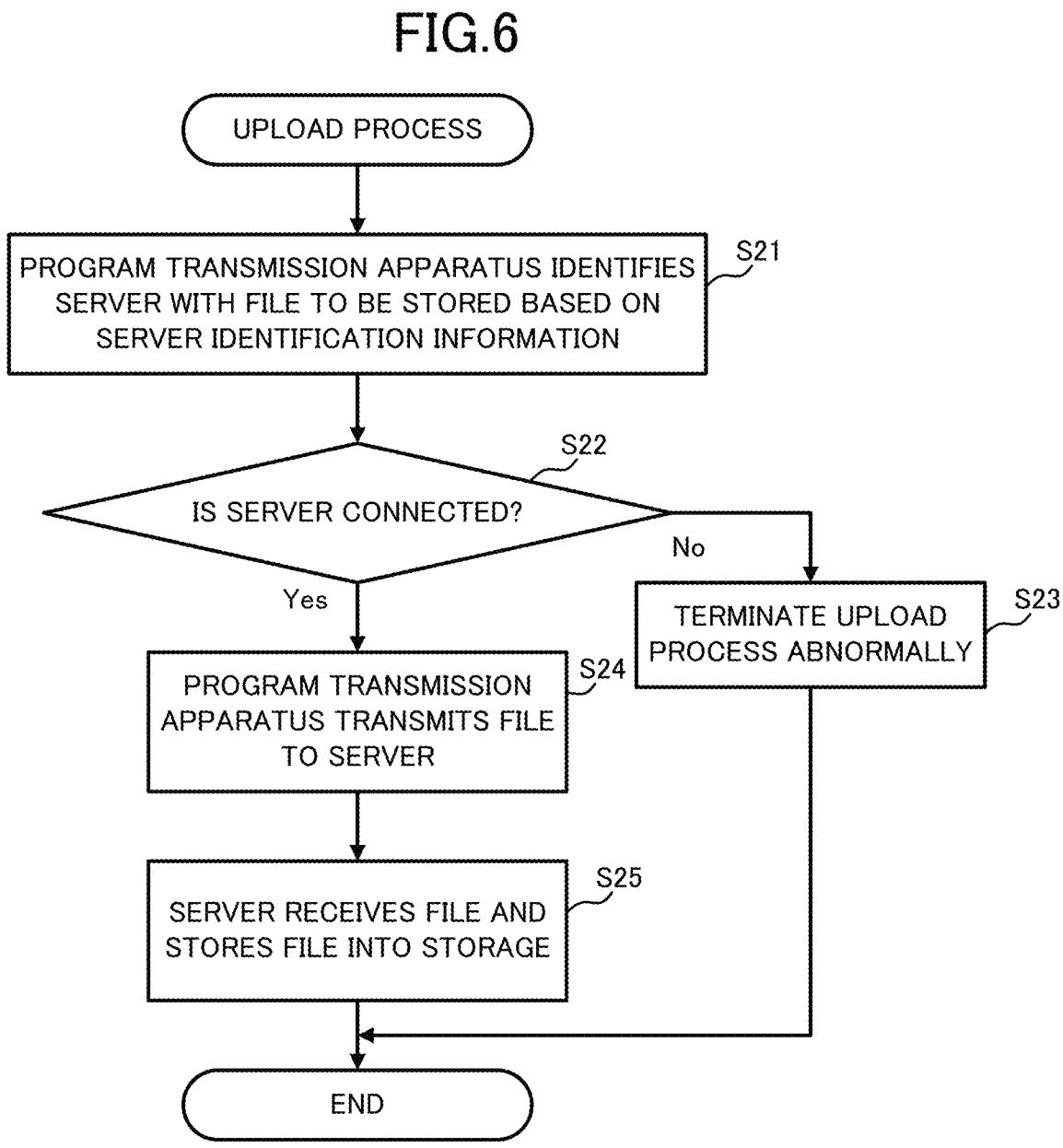
FIG. 6 is a flowchart illustrating an upload process according to Embodiment 1.

The processes performed by the control system 1000 are described with reference to FIGS. 5 to 7. The flowcharts illustrated in FIGS. 5 to 7 are examples. The steps may be performed in any other order as appropriate.

FIG. 5 illustrates a file generation process performed by the program transmission apparatus 10 to generate the file 73. In the file generation process, as illustrated in FIG. 5, the program transmission apparatus 10 generates the confidential data 80 and shares the generated confidential data 80 with the PLC 40 (step S11). More specifically, the confidential data generator 112 generates the confidential data 80 as a key in a message authentication code and shares confidential data 80 with the PLC 40 with any of the methods described above.

The program transmission apparatus 10 then acquires the control program (step S12). More specifically, the program acquirer 111 may acquire the control program 70 by converting a source code input by the user U1 or a source code read from an address specified by the user U1 into an executable format or by reading the control program 70 that has already been converted into an executable format from an address specified by the user.

The program transmission apparatus 10 then generates the first code 71 using the confidential data 80 generated in step S11 and the control program 70 acquired in step S12 (step S13). More specifically, the first code generator 113 calculates the first code 71 corresponding to the message authentication code using the confidential data 80 as a key and the control program 70 as a message.

The file generator 114 of the program transmission apparatus 10 then generates the file 73 including the control program 70 acquired in step S12 and the first code 71 generated in step S13 and compresses and encrypts the generated file 73 to store the generated file 73 into the storage 12 (step S14). The file generation process then ends.

FIG. 6 illustrates an upload process for uploading the generated file 73 to the server 30. In the upload process, as illustrated in FIG. 6, the program transmission apparatus 10 identifies the server 30 with the file 73 to be stored based on the server identification information 121 (step S21). More specifically, the transmitter 13 identifies the network address of the server 30.

The transmitter 13 then determines whether the server 30 identified in step S21 is connected (step S22). More specifically, the transmitter 13 determines whether communication can be established with a device having the network address identified in step S21. When the communication with the server 30 cannot be established, and no response is acquired from the server 30, the result of determination in step S22 is negative.

When the server 30 is determined to be disconnected (No in step S22), the program transmission apparatus 10 terminates the upload process abnormally (step S23). In contrast, when the server 30 is determined to be connected (Yes in step S22), the program transmission apparatus 10 reads the file 73 from the storage 12 and transmits the file 73 to the server 30 (step S24). The server 30 receives the file 73 and stores the file 73 into the storage 32 (step S25). The upload process ends.

FIG. 7 illustrates a download process for downloading the file 73 stored in the server 30 to the PLC 40. In the download process, as illustrated in FIG. 7, the PLC 40 starts up when an administrator for the PLC 40 presses a power button of the PLC 40 (step S31).

The PLC 40 then identifies the server 30 and the file 73 based on the source information (step S32). More specifically, the requester 431 of the PLC 40 reads the server identification information 422 and the file identification information 423 included in the program source information 421 from the storage 42.

The PLC 40 then requests the server 30 identified in step S32 to transmit the file 73 identified in step S32 (step S33). For example, when the IP address, 192.168.20.100, is identified as the server identification information 422 in step S32, and the file name, CTRL_PROGRAM40, is identified as the file identification information 423, the receiver 41 transmits a packet to the above IP address to request the transmission of the file 73 having the above file name in accordance with an instruction from the requester 431.

The PLC 40 then determines whether a response is provided from the server as a transmission destination of a request in step S33 (step S34). More specifically, the receiver 41 determines whether a response is provided to the packet transmitted in step S33 within a predetermined period after the packet is transmitted in step S33.

When no response has been provided from the server 30 (No in step S34), the PLC 40 determines that an abnormality has occurred (step S35) and terminates the download process. No response may be provided from the server 30 when, for example, the server 30 identified in step S32 is disconnected from the network 20, or the file 73 identified in step S32 is not stored in the server 30. In step S35, the PLC 40 may report the abnormality to the administrator with the outputter 65.

In contrast, when a response is provided from the server (Yes in step S34), the server 30 transmits the file 73 to the PLC 40 in response to the request in step S33 (step S36). More specifically, the transmitter 33 of the server 30 reads the file 73 having the file name specified by the PLC 40 in the request in step S33 from the storage 32 and transmits the file 73 to the PLC 40.

The receiver 41 of the PLC 40 then receives the file 73 and stores the file 73 into the storage 42 (step S37). The extractor 432 decompresses and decodes the file 73 to extract the receiving program 70a and the first code 71 (step S38).

The second code generator 433 of the PLC 40 then generates the second code 72 from the confidential data 80 stored by the storage 42 of the PLC 40 and the receiving program 70a extracted in step S38 (step S39). More specifically, the second code generator 433 calculates the second code 72 corresponding to the message authentication code using the confidential data 80 as the key and the receiving program as the message.

The collator 434 of the PLC 40 then collates the first code 71 extracted in step S38 with the second code 72 generated in step S39 to determine whether the two codes match (step S40). More specifically, the collator 434 compares the first code 71 with the second code 72 to determine whether these codes have the same bit sequence.

When the two codes are determined not to match (No in step S40), the PLC discards the received receiving program 70a without executing the receiving program (step S41) and advances the processing to step S35. In contrast, when the two codes are determined to match (Yes in step S40), the collator 434 determines that the receiving program 70a has no corrupt portion or is not tampered from the control program 70 and writes the control program 70 to the program memory 44 (step S42).

The executor 435 of the PLC 40 determines whether an instruction to execute the control program 70 is provided (step S43). When no execution instruction is provided (No in step S43), the executor 435 repeats the determination in step S43 and waits until receiving an execution instruction. When an execution instruction is provided (Yes in step S43), the executor 435 reads the control program 70 from the program memory 44 and executes the control program 70 (step S44). This causes the PLC 40 to control the device 50 in accordance with the control program 70 provided by the program transmission apparatus 10.

As described above, the first code generator 113 of the program transmission apparatus 10 generates the first code 71 from the control program 70 and the confidential data 80. The receiver 41 of PLC 40 receives the receiving program 70a at the startup of the PLC 40, the second code generator 433 generates the second code 72 from the receiving program 70a and the confidential data 80, and the executor 435 executes the receiving program 70a when the first code 71 is identical to the second code 72. The receiving program 70a received from the server 30 is thus executed when the receiving program 70a is identical to the control program 70 transmitted from the program transmission apparatus 10. This structure improves the security relating to a program acquired from an external source by the PLC 40 as the programmable controller.

Figure 8:
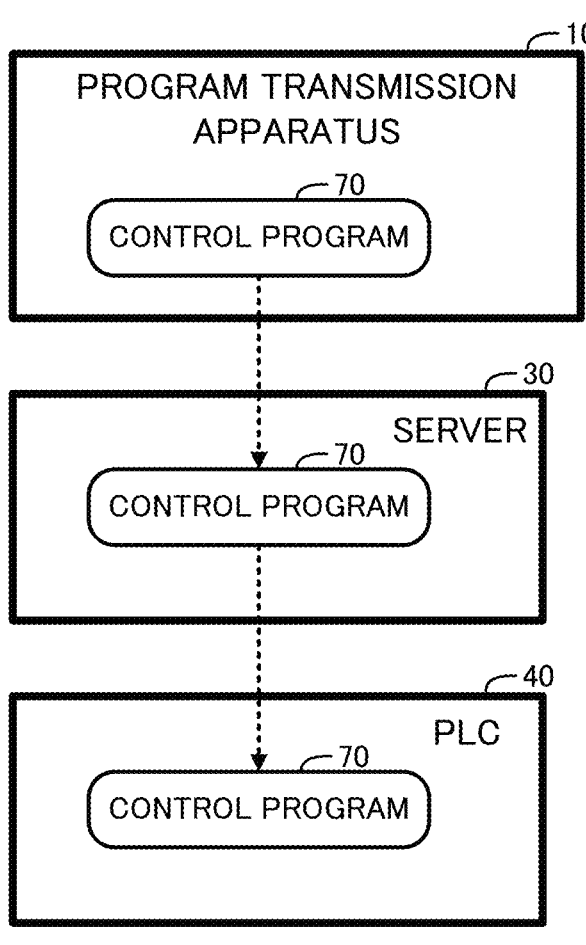
FIG. 8 is a diagram for explanation of transmission of a control program according to a comparative example.

FIG. 8 schematically illustrates transmission of the control program 70 in a comparative example. In the comparative example, the control program 70 is uploaded from the program transmission apparatus 10 to the server 30 and provided to the PLC 40 without verification of presence or absence of alteration to the program through collation of codes.

Figure 9:
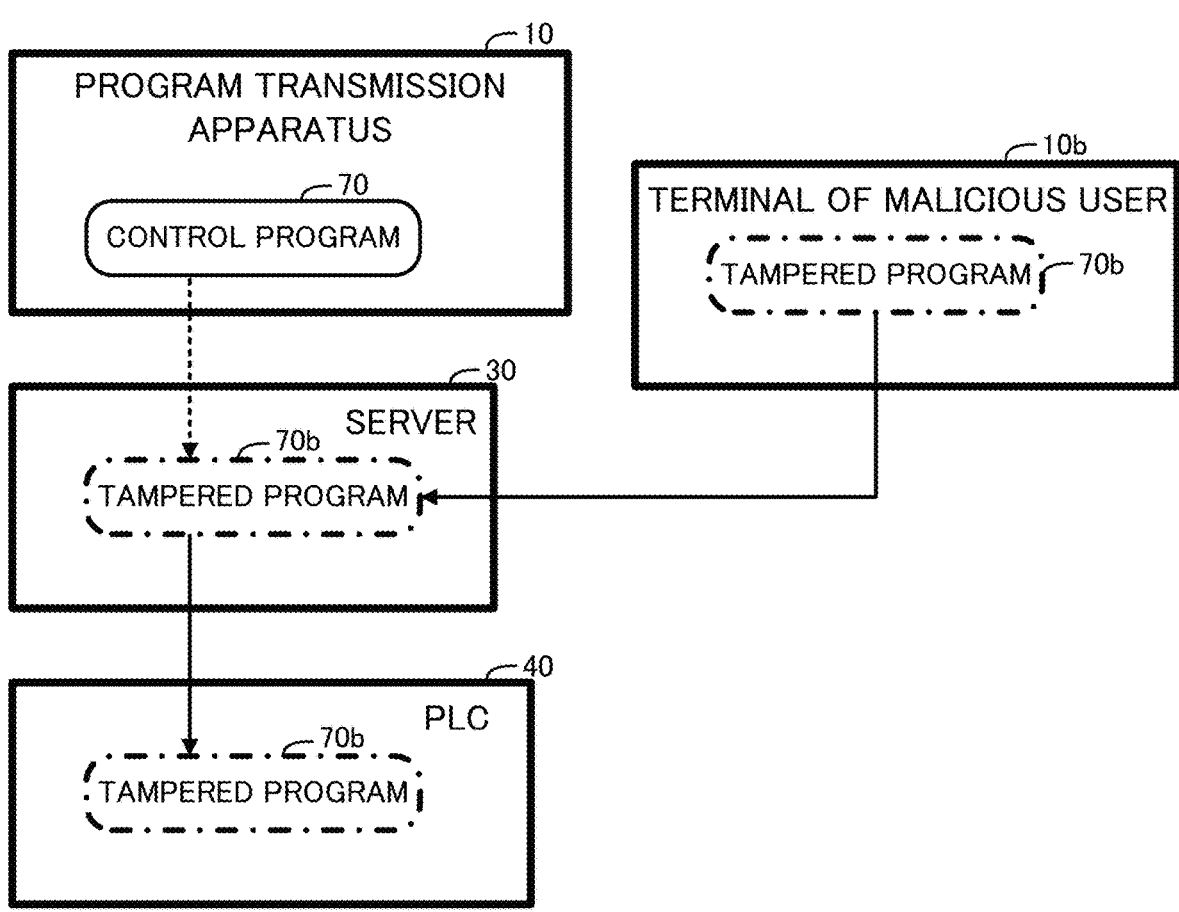
FIG. 9 is a diagram for explanation of an alteration of the control program according to the comparative example.

However, as illustrated in FIG. 9, in such a comparative example, a malicious user may upload, from a terminal 10b, a tampered program 70b that has been altered from the control program 70 and replace the control program 70. The PLC 40 acquires the tampered program 70b as the control program 70 from the server 30 at the startup and executes the tampered program 70b.

In contrast, the control system 1000 according to the present embodiment stores and manages codes that are uniquely generated from the combination of the control program 70 and the confidential data 80 in a pair with the control program 70 in the server 30. Thus, when the PLC 40 acquires the receiving program 70a as the control program 70, the first code 71 and the second code 72 can be used for verification of presence of absence of alteration from the control program 70. When the first code 71 differs from the second code 72, the executor 435 of the PLC 40 does not write the receiving program 70a to the program memory 44 and discards the receiving program without execution. This reduces the likelihood of unintentional writing of the receiving program 70a to the PLC 40 when the PLC 40 has a netboot function for acquiring the program to be executed from the server 30 through the network communication. This allows more secure updating of the program.

In the control system 1000, the first code 71 corresponding to the message authentication code between the program transmission apparatus 10 and the PLC 40 is used to detect an alteration of the program stored in the server 30. The computational burden with such a method using the first code 71 is less than the computational burden with a method using digital signatures that can detect an alteration of data to be transmitted. This can reduce the boot time at the startup of the PLC 40 to avoid a decrease in the production efficiency in the control system 1000.

In the control system 1000, the file generator 114 of the program transmission apparatus 10 generates the encrypted file 73, and the extractor 432 in the PLC 40 decodes the file 73. This allows the server 30 to store the encrypted file 73 and improve security against data leakage and other security concerns.

Embodiment 2

Embodiment 2 is described focusing on the differences from Embodiment 1. Components that are the same or equivalent to those of Embodiment 1 are denoted with the same reference signs. The present embodiment differs from Embodiment 1 in that multiple pieces of the confidential data 80 that are mutually different are used for multiple users of the program transmission apparatus 10.

Figure 10:
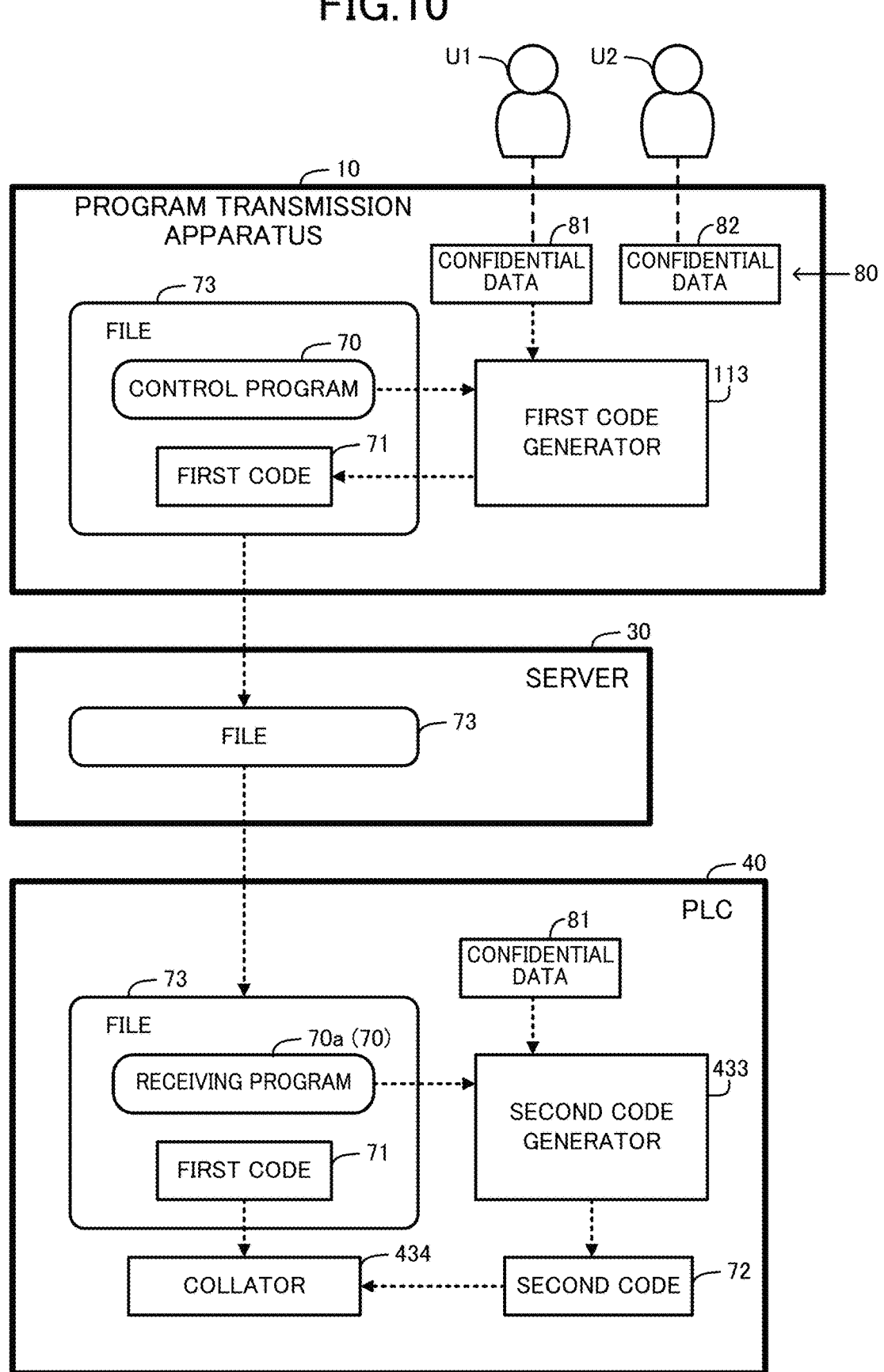
FIG. 10 is a diagram for explanation of confidential data according to Embodiment 2.

As illustrated in FIG. 10, the program transmission apparatus 10 in the present embodiment generates multiple pieces of the confidential data 80. In detail, the program transmission apparatus 10 generates in advance, as the confidential data 80, confidential data 81 corresponding to the user U1 of the program transmission apparatus and confidential data 82 corresponding to a user U2 of the program transmission apparatus 10. The first code generator 113 of the program transmission apparatus 10 generates the first code 71 using the confidential data 80 for one user of the users U1 and U2 who provides the control program 70. In the example of FIG. 10, the first code 71 is generated using the confidential data 81 corresponding to the user U1.

The PLC 40 simply stores the confidential data 81 that is prespecified data, without storing the confidential data 82. The PLC 40 then generates the second code 72 using the confidential data 81. When the receiving program 70a is identical to the control program 70 and the control program 70 is provided by the user U1, the control program 70 is executed by the PLC 40. Even in the case in which the receiving program 70a is identical to the control program 70, when the control program 70 provided by the user U2 has the first code 71 different from the second code 72, the control program 70 is not executed and is discarded by the PLC 40.

As described above, the program acquirer 111 of the program transmission apparatus 10 acquires the control program 70 provided by any of multiple users, and the first code generator 113 generates the first code 71 from the control program 70 and the confidential data 80 corresponding to the user who provides the control program 70. The second code generator 433 of the PLC 40 generates the second code 72 from the receiving program 70a and the confidential data 80 corresponding to a specific one user of the multiple users. This allows management for each user as to whether execution of the control program 70 is permissible.

Although the first code generator 113 generates the first code 71 using the confidential data 80 for the user who provides the control program 70 in the above example, the example is not limited to this. For example, the first code generator 113 may generate the first code 71 using the confidential data 80 for the user who inputs a transmission instruction for the control program 70. When multiple users edit the single control program 70 in cooperation, the PLC 40 can execute the control program 70 when the program is being uploaded to the server 30 by a user authorized to transmit the control program 70 to the PLC 40 and avoid executing the control program 70 when the program is being uploaded by a user unauthorized to transmit the control program 70. The first code generator 113 generates the first code 71 from the confidential data 80 corresponding to one user of the multiple users who is a user of the control program 70.

Embodiment 3

Embodiment 3 is described focusing on the differences from Embodiment 1. Components that are the same or equivalent to those of Embodiment 1 are denoted with the same reference signs. The present embodiment differs from Embodiment 1 in that multiple pieces of the confidential data 80 that are mutually different are used for multiple program transmission apparatuses.

Figure 11:
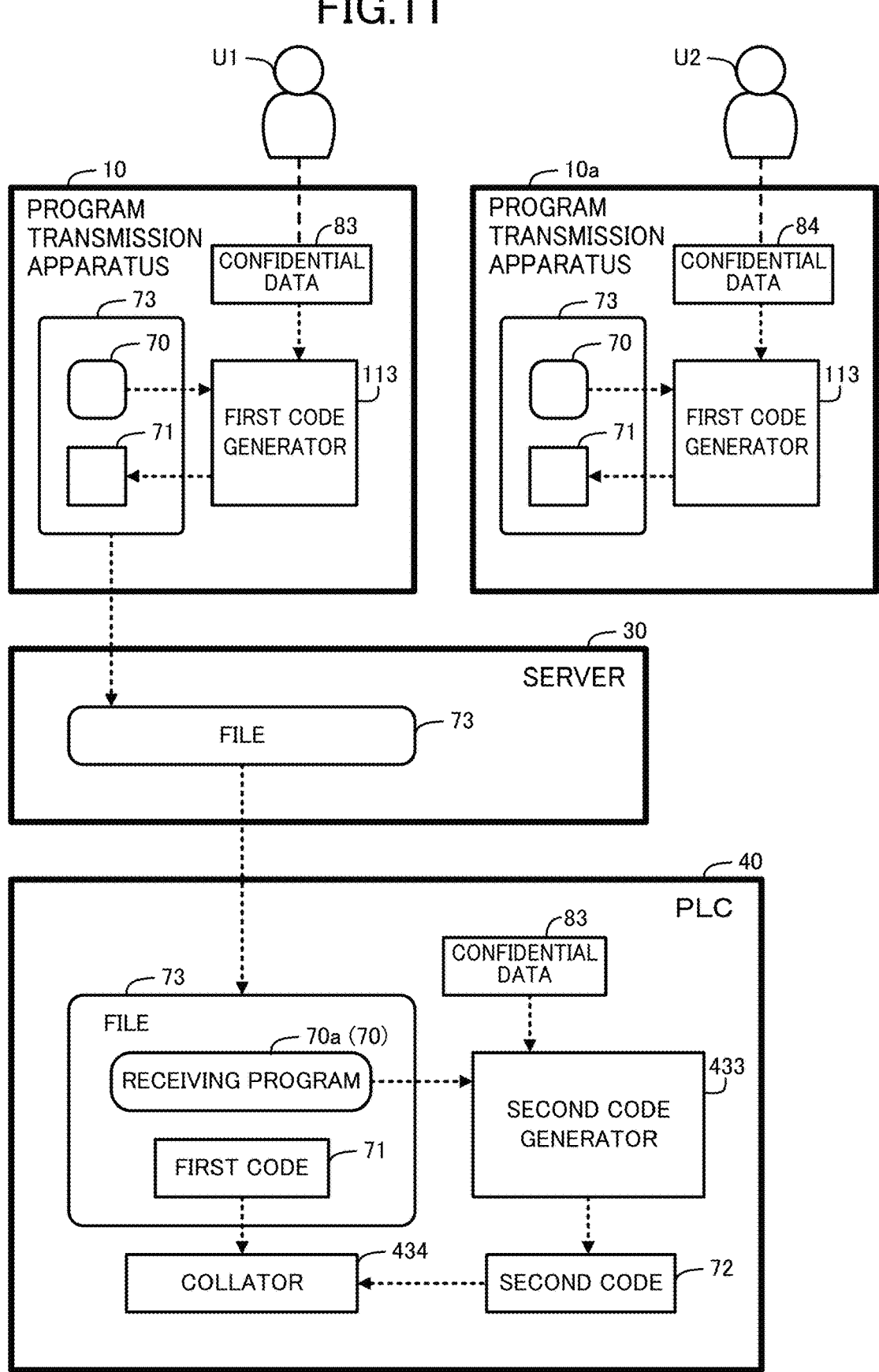
FIG. 11 is a diagram for explanation of confidential data according to Embodiment 3.

As illustrated in FIG. 11, the control system 1000 according to the present embodiment includes multiple program transmission apparatuses 10 and 10a, and the confidential data 80 generated by the program transmission apparatus 10 and the confidential data 80 generated by the program transmission apparatus 10a are different. In detail, the program transmission apparatus 10 generates confidential data 83, and the program transmission apparatus 10a generates confidential data 84 that differs from the confidential data 83. The first code generator 113 of each of the program transmission apparatuses 10 and 10a generates the first code 71 using the confidential data 80 for the program transmission apparatus including the first code generator 113. In the example of FIG. 11, the first code 71 is generated in the program transmission apparatus 10 using the confidential data 83.

The PLC 40 simply stores the confidential data 83 that is prespecified data, without storing the confidential data 84. The PLC 40 generates the second code 72 using the confidential data 83. When the receiving program 70a is identical to the control program 70, and the control program 70 is provided by the program transmission apparatus 10, the control program 70 is executed by the PLC 40. Even in the case in which the receiving program 70a is identical to the control program 70, when the control program 70 provided by the program transmission apparatus 10a has the first code 71 different from the second code 72, the control program 70 is not executed and is discarded by the PLC 40.

As described above, the first code generator 113 of each of the multiple program transmission apparatuses 10 and 10a generates the first code 71 from the control program 70 and the confidential data 80 corresponding to the program transmission apparatus including the first code generator 113. The second code generator 433 of the PLC 40 generates the second code 72 from the receiving program 70a and the confidential data 80 shared in advance with a specific one program transmission apparatus of the multiple program transmission apparatuses 10 and 10a. This allows management for each of the program transmission apparatuses as to whether execution of the control program 70 is permissible.

Although the example uses two users in Embodiment 2, the users of the program transmission apparatus 10 may be three or more users. Although the example uses the two program transmission apparatuses in Embodiment 3, the program transmission apparatuses may be three or more program transmission apparatuses.

Although the PLC 40 stores a single data piece as the confidential data 80 in the above examples, the PLC 40 may store specific multiple data pieces that are each the confidential data 80, may repeatedly collate the second code 72 generated using each data piece that is the confidential data 80 with the first code 71, and may store the receiving program 70a as the control program 70 into the program memory 44 when any second code 72 is identical to the first code 71.

In Embodiments 2 and 3 described above, the PLC 40 may also store the confidential data 80 corresponding to a user or a program transmission apparatus unauthorized to write the control program 70 to the PLC 40 through the server 30. The PLC 40 may exclude the confidential data 80 corresponding to such an unauthorized user or an unauthorized program transmission apparatus from collation by the collator 434.

Although one or more embodiments of the present disclosure have been described above, the present disclosure is not limited to the above embodiments.

Although all of the program transmission apparatus 10, the server 30, and the PLC 40 included in the control system 1000 are located at a facility in the above embodiments, the embodiments are not limited to this. For example, the program transmission apparatus 10 and the server 30 may be connected to the PLC 40 located at a facility through the network 20 that is a wide-area communication network such as the Internet.

The program transmission apparatus 10, the server 30, and the PLC 40 may not be connected through the single network 20. For example, the program transmission apparatus 10 and the server 30 may be connected to each other through an information network such as a LAN, and the server 30 and the PLC 40 may be connected to each other through an industrial network. One or both of a transmission line connecting the program transmission apparatus 10 to the server 30 and a transmission line connecting the server 30 to the PLC 40 may be a dedicated line instead of a network.

Figure 12:
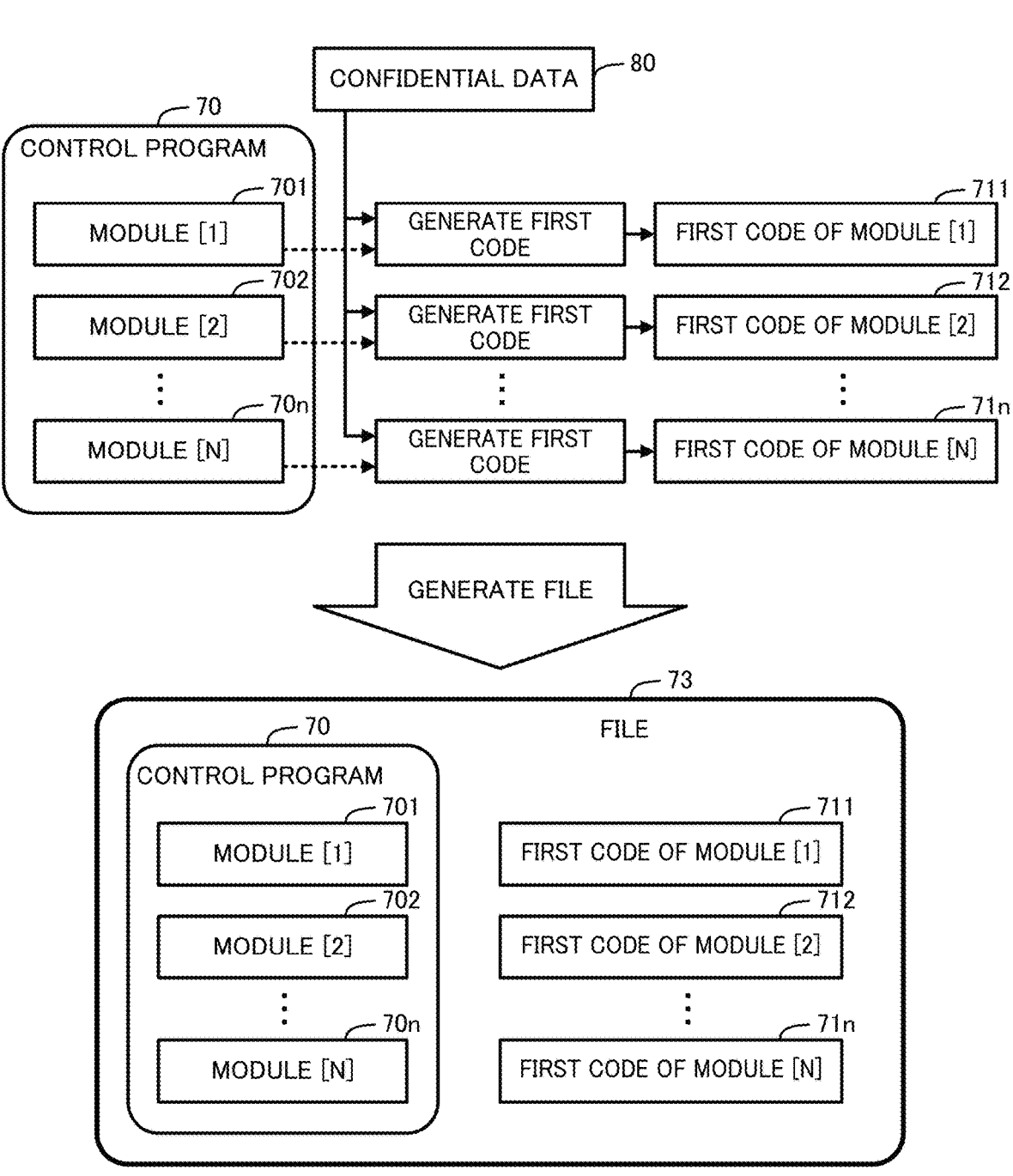
FIG. 12 a file structure according to a modification.

Although the single first code 71 is generated for the control program 70 in the above examples, the examples are not limited to this. For example, as illustrated in FIG. 12, the program transmission apparatus 10 may generate first codes 711, 712, . . . , 71n for each of modules 701, 702, . . . , 70n included in the control program 70 using the confidential data 80. The program transmission apparatus 10 may generate the control program 70 and the file 73 including the generated multiple first codes 711, 712, . . . , 71n. In the example illustrated in FIG. 12, the PLC 40 may generate the second code 72 for each module as in the embodiments described above and compare the two codes.

Although the program transmission apparatus 10 generates the confidential data 80 in the examples described above, the examples are not limited to this. The confidential data 80 generated by the PLC 40 may be shared with the program transmission apparatus 10, or the confidential data 80 generated by another device may be shared with the program transmission apparatus 10 and the PLC 40.

Although the program transmission apparatus 10 and the server 30 are separate from each other in the above examples, the examples are not limited to this. For example, the program transmission apparatus 10 that is a terminal may have the function of the server 30 to integrate the program transmission apparatus 10 and the server 30. The server 30 may be eliminated from the control system 1000 described above. The program transmission apparatus 10 that is a terminal or a server may then transmit the control program 70 directly to the PLC 40. Although the server 30 is eliminated, any alteration during transmission of the control program 70 is detected to improve the security relating to a program acquired from an external source by the PLC 40.

The functions of the program transmission apparatus 10, the server 30, and the PLC 40 can be implemented by a dedicated hardware device or by a common computer system.

For example, the program P1 executable by the processor 61 may be stored in a non-transitory computer-readable recording medium for distribution. The program P1 can be installed in a computer to provide a device that performs the above processing. Examples of such a non-transitory recording medium include a flexible disc, a compact disc read-only memory (CD-ROM), a digital versatile disc (DVD), and a magneto-optical disk (MO).

The program P1 may be stored in a disk unit included in a server in a communication network, such as the Internet, and may be, for example, superimposed on a carrier wave to be downloaded to a computer.

The processing described above may also be performed by the program P1 being activated and executed while being transferred through a communication network.

The processing described above may also be performed by the program P1 being entirely or partially executed on a server with a computer transmitting and receiving information about the processing through a communication network.

In the system with the above functions implementable partially by the operating system (OS) or through cooperation between the OS and applications, portions executable by applications other than the OS may be stored in a non-transitory recording medium that may be distributed or may be downloaded to the computer.

Means for implementing the functions of the program transmission apparatus 10, the server 30, and the PLC 40 are not limited to software, but may be implemented partially or entirely by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The structure according to one or more embodiments of present disclosure is suitable for a system including a programmable controller that acquires, from an external source, a program to be executed.

REFERENCE SIGNS LIST

1000 Control system
10, 10a Program transmission apparatus
10b Terminal
11 Processing unit
111 Program acquirer
112 Confidential data generator
113 First code generator
114 File generator
12 Storage
121 Server identification information
13 Transmitter
20 Network
30 Server
31 Receiver
32 Storage
33 Transmitter
40 PLC
41 Receiver
42 Storage
421 Program source information
422 Server identification information
423 File identification information
43 Processing unit
431 Requester
432 Extractor
433 Second code generator
434 Collator
435 Executor
44 Program memory
50 Device
61 Processor
62 Main storage
63 Auxiliary storage
64 Inputter
65 Outputter
66 Communicator
67 Internal bus
70 Control program
70a Receiving program
70b Program
701, 702, 70n Module
71, 711, 712, 71n First code
72 Second code
73 File
80 to 84 Confidential data
P1 Program
U1, U2 User

The invention claimed is:
1. A control program transmission method to be performed by (i) a programmable controller to control a device and (ii) a program transmission apparatus to transmit a control program for causing the programmable controller to control the device, the control program transmission method comprising:

generating, by the program transmission apparatus and in response to issuance of a transmission instruction for the control program from one user of a plurality of users that is a user of the control program, a first code from (i) the control program and (ii) predetermined data that corresponds to the one user, the first code being for verification of presence or absence of a change from the control program;

transmitting, by the program transmission apparatus, the control program and the first code;

receiving, by the programmable controller, the first code and a receiving program as the control program transmitted by the program transmission apparatus;

generating, by the programmable controller, by the predetermined procedure, a second code from (i) the receiving program and (ii) the predetermined data that is shared in advance with the program transmission apparatus and that corresponds to a specific user of the plurality of users;

determining, by the programmable controller, whether the first code generated by the program transmission apparatus is identical to the second code generated by the programmable controller; and executing, by the programmable controller, the receiving program when the first code generated by the program transmission apparatus is identical to the second code generated by the programmable controller.

2. A control system comprising:

a programmable controller to control a device; and a program transmission apparatus to transmit a control program for causing the programmable controller to control the device, the program transmission apparatus including
    program acquiring circuitry to acquire the control program,
    first code generating circuitry to generate, in response to issuance of a transmission instruction for the control program from one user of a plurality of users that is a user of the control program, a first code from (i) the control program and (ii) predetermined data that corresponds to the one user by a predetermined procedure, the first code being for verification of presence or absence of a change from the control program, and
    a transmitter to transmit the control program and the first code, the programmable controller including
    a receiver to receive the first code and a receiving program as the control program transmitted by the transmitter,
    second code generating circuitry to generate, by the predetermined procedure, a second code from (i) the receiving program and (ii) the predetermined data that is shared in advance with the program transmission apparatus and that corresponds to a specific user of the plurality of users,
    collator circuitry to determine whether the first code generated by the first code generating circuitry of the program transmission apparatus is identical to the second code generated by the second code generating circuitry of the programmable controller, and
    executing circuitry to execute the receiving program when the first code generated by the first code generating circuitry of the program transmission apparatus is identical to the second code generated by the second code generating circuitry of the programmable controller.

3. The control system according to claim 2, wherein, when the first code generated by the first code generating circuitry of the program transmission apparatus is not identical to the second code generated by the second code generating circuitry of the programmable controller, the executing circuitry discards the receiving program without executing the receiving program.

4. The control system according to claim 2, wherein the first code generating circuitry generates, as the first code, a hash value of (i) the predetermined data and (ii) the control program, and the second code generating circuitry generates, as the second code, a hash value of (i) the predetermined data and (ii) the receiving program.

5. The control system according to claim 2, wherein the program transmission apparatus includes a plurality of program transmission apparatuses, the first code generating circuitry of each of the plurality of program transmission apparatuses generates the first code from (i) the control program and (ii) the predetermined data that corresponds to the program transmission apparatus including the first code generating circuitry, and the second code generating circuitry of the programmable controller generates the second code from (i) the receiving program and (ii) the predetermined data that is shared in advance with a specific program transmission apparatus of the plurality of program transmission apparatuses.

6. The control system according to claim 2, wherein the program transmission apparatus further includes encrypting circuitry to encrypt the control program and the first code, the transmitter transmits the control program and the first code encrypted by the encrypting circuitry, the receiver receives the encrypted receiving program and the encrypted first code, and the programmable controller further includes decoding circuitry to decode the encrypted receiving program and the encrypted first code.

7. The control system according to claim 2, further comprising:

a server, wherein the transmitter of the program transmission apparatus transmits the control program and the first code to the server, and the server receives the control program and the first code transmitted by the transmitter and transmits, to the programmable controller, the received first code and the receiving program as the received control program.

8. The control system of claim 2, wherein the predetermined data is a random bit sequence.

9. The control system of claim 2, wherein the predetermined data is shared from the program transmission apparatus to the programmable controller via a non-transitory recording medium.

10. The control system of claim 2, wherein the predetermined data is shared from the program transmission apparatus to the programmable controller via a direct communication line.

11. The control system of claim 2, wherein the program transmission apparatus further includes file generating circuitry to generate a file comprising both the control program and the first code.

12. The control system of claim 11, wherein the programmable controller further includes extractor circuitry to decompress and decode the file to extract the receiving program and the first code.

13. The control system of claim 2, wherein the first code generating circuitry generates the first code for each of a plurality of modules included in the control program.

* * * * *